United States Patent
Devos et al.

(10) Patent No.: US 7,071,620 B2
(45) Date of Patent: Jul. 4, 2006

(54) DISPLAY PIXEL MODULE FOR USE IN A CONFIGURABLE LARGE-SCREEN DISPLAY APPLICATION AND DISPLAY WITH SUCH PIXEL MODULES

(75) Inventors: Bruno Devos, Zulte (BE); Herbert Van Hille, Cambridge, MA (US); Nele Dedene, Houthalen-Helchteren (BE); Patrick Willem, Ostend (BE); Robbie Thielemans, Nazareth (BE); Karim Meersman, Kortemark (BE)

(73) Assignee: BARCO, naamloze vennootschap, Kotrijk (BE)

( * ) Notice: Subject to any disclaimer, the term of this patent is extended or adjusted under 35 U.S.C. 154(b) by 231 days.

(21) Appl. No.: 10/697,093

(22) Filed: Oct. 31, 2003

(65) Prior Publication Data

US 2005/0052374 A1 Mar. 10, 2005

(30) Foreign Application Priority Data

Sep. 8, 2003 (EP) .................................. 03077825

(51) Int. Cl.
*G09G 3/32* (2006.01)
(52) U.S. Cl. ...................... 313/512; 362/249; 345/903; 345/82
(58) Field of Classification Search ................. 313/500
See application file for complete search history.

(56) References Cited

U.S. PATENT DOCUMENTS

| 4,543,759 | A | | 10/1985 | Rohrer |
| 5,410,328 | A | * | 4/1995 | Yoksza et al. ................. 345/82 |
| 5,733,154 | A | * | 3/1998 | Libregts ..................... 439/850 |
| 6,065,854 | A | * | 5/2000 | West et al. .................. 362/249 |
| 6,220,732 | B1 | * | 4/2001 | Paffrath ....................... 362/496 |
| 6,614,103 | B1 | * | 9/2003 | Durocher et al. ........... 257/678 |
| 2002/0024807 | A1 | * | 2/2002 | Maglica ...................... 362/205 |
| 2005/0225222 | A1 | * | 10/2005 | Mazzochette et al. ........ 313/46 |

FOREIGN PATENT DOCUMENTS

| DE | 21 10 318 | 9/1972 |
| DE | 77 17 253 | 3/1978 |
| DE | 31 37 709 A1 | 4/1983 |
| EP | 0 564 311 A1 | 10/1993 |
| GB | 840 329 | 6/1960 |

* cited by examiner

*Primary Examiner*—Ashok Patel
(74) *Attorney, Agent, or Firm*—Bacon & Thomas, PLLC

(57) ABSTRACT

A display pixel module for use in a configurable large-screen display application, with an array of pixels (122) mounted at the front (200) of the module (120) and provided with input and output connectors (206–207), characterized in that at least some of the side walls (202) and of the upper and lower walls (203–204) are tapered inwardly, enclosing an angle (A) with the front (200) and in that it is provided with mounting means to fix the module on a mounting surface of a display.

17 Claims, 5 Drawing Sheets

DISPLAY PIXEL MODULE FOR USE IN A CONFIGURABLE LARGE-SCREEN DISPLAY APPLICATION AND DISPLAY WITH SUCH PIXEL MODULES

FIELD OF THE INVENTION

The present invention relates to a pixel module for use in a configurable modular large-scale display. In particular, this invention relates to a scalable display element consisting of a pixel module, preferably a light-emitting diode (LED) pixel module.

BACKGROUND OF THE INVENTION

Conventional incandescent lamps, fluorescent lamps, and neon tubes have long been used to illuminate many large-scale commercial and public signs. The market is now, however, demanding larger displays with the flexibility to customize display sizes and colors which are not possible with these older technologies. As a result, many displays now utilize LEDs in their design because LEDs consume less electrical energy than conventional light sources and possess a much longer lifetime with lower maintenance costs.

LED technology is currently being applied to large-scale display applications, such as outdoor or indoor stadium displays, large marketing advertisement displays, and mass-public informational displays. Many of these large-scale applications are dynamically reconfigurable under computer control. In addition, some large-scale animated displays that are capable of displaying video imaging are now being produced. Other simpler types of illuminated signs also use LEDs, including outdoor signs in which LED arrays are used to illuminate a sign plate from its sides. Additionally, LEDs are used in many temporary sign applications, such as large banners at trade shows, that require bright, eye-catching, flexible systems that are easily portable.

Currently, large-scale display systems are supported by structural members such as metal frames and other types of rigid brackets in which orthogonal LED modules are bolted in place to the structural members. However, standard metal brackets are restrictive, often yielding only orthogonal two-dimensional (2D) displays, and therefore do not lend themselves to the variety of applications in which the front face of the overall display is a simple or complex three-dimensional (3D) curved surface. There is a demand in the market not only for 2D displays, but also for 3D displays. Technical challenges exist in forming a display system with the flexibility to form various 2D or 3D shapes and, furthermore, in providing control of such a system. What is needed is a system of individual pixel elements that are configurable to form LED displays having 2D or 3D shapes.

In addition, brackets and other similar support systems often employ cumbersome methods of fixing LED modules to the frame, such as mechanical fasteners. Such methods do not allow for the easy removal and replacement of individual LED modules, thereby making maintenance difficult. For example, in a current system, if a LED module becomes inoperative, replacement typically requires access to the rear of the display and involves removing screws, bolts, connectors and other mechanical fasteners, resulting in a process that is tedious and time consuming.

What is further needed is a system with a LED module design that allows easy installation and easy replacement of modules from the front or the rear of a large-scale display.

An example of a LED pixel module that is used to display a pixel on a large-scale display is described in U.S. Pat. No. 5,410,328, entitled, "Replaceable intelligent pixel module for large-scale LED displays." This patent describes an apparatus for a detachable LED pixel module that contains a plurality of LEDs along with a processor with input and output capabilities. The rear wall includes an aperture to receive an electrical jack from the display so as to communicate data, power and commands to the LED module. The input and output capabilities of the processors along separate data paths allow modules to be "daisy-chained" together, allowing data to be passed through a succession of modules that receive power and monitor command signals from the interconnecting ribbon cables.

Although the apparatus of U.S. Pat. No. 5,410,328 is capable of displaying a pixel on a large-scale display, this patent makes no claim concerning its applicability in non-planar large-scale displays.

SUMMARY OF THE INVENTION

It is therefore an object of the invention to provide a pixel module design, in particular a LED module design, that can be easily installed.

It is another object of this invention to provide a pixel module with a simple electrical connection mechanism.

It is yet another object of the invention to provide a pixel module for a large-scale display in which the module can be easily replaced from the front or the rear of the large-scale display.

It is yet another object of this invention to provide a pixel module design that can be easily used in various 2D or 3D shapes.

To this end the present invention provides for a display pixel module for use in a configurable large-screen display application, with an array of pixels mounted at the front of the module and provided with input and output connectors, characterized in that at least some of the side walls and of the upper and lower walls are tapered inwardly, enclosing an angle with the front and in that it is provided with mounting means to fix the module on a mounting surface of a display.

It is clear that due to the tapering walls, the pixel modules can be assembled and arranged on a mounting surface to form a display with a complex 2D or 3D curved shape.

Preferably the mounting means are formed by at least two clips protruding from the rear of the pixel module, each clip including a clip notch that further includes a clip stop and a clip notch taper, permitting to mount the pixel module in an angle to the mounting surface, in order to be able to construct even more complex shaped displays.

Preferably the housing of the pixel module is provided with notches which allow access to the clips from the front of the pixel module, so that the pixel modules can easily be removed and replaced by the front of the display.

Following a preferred embodiment, the pixel module is composed of separate parts which can easily be assembled to form a pixel module which can easily be fixed on a mounting surface and can easily be interconnected with other electronic components of the display or with other pixel modules.

Therefore, in a preferred embodiment, the pixel module consists of a housing formed by an enclosure which is closed by a shader by means of assembly snaps, which housing further accommodates a pixel printed circuit board and a driver printed circuit board which are interconnected, either by means of a board-to-board connector, either by means of a flex-foil.

The invention also relates to a display that comprises a plurality of pixel modules according to the invention, which pixel modules are arranged on a suitable mounting surface to form a 2D or 3D display.

BRIEF DESCRIPTION OF THE DRAWINGS

With the intention of better showing the characteristics of the invention, hereafter, as an example without any limitative character, a preferred form of embodiment is described of a pixel module according to the invention and a display with such pixel modules, with reference to the accompanying drawings, wherein.

DETAILED DESCRIPTION OF A PREFERRED EMBODIMENT

The present invention is a pixel display module, in particular a LED display module, that implements a small array of LED pixels for use in a scaleable large-screen display application.

Figure 1:
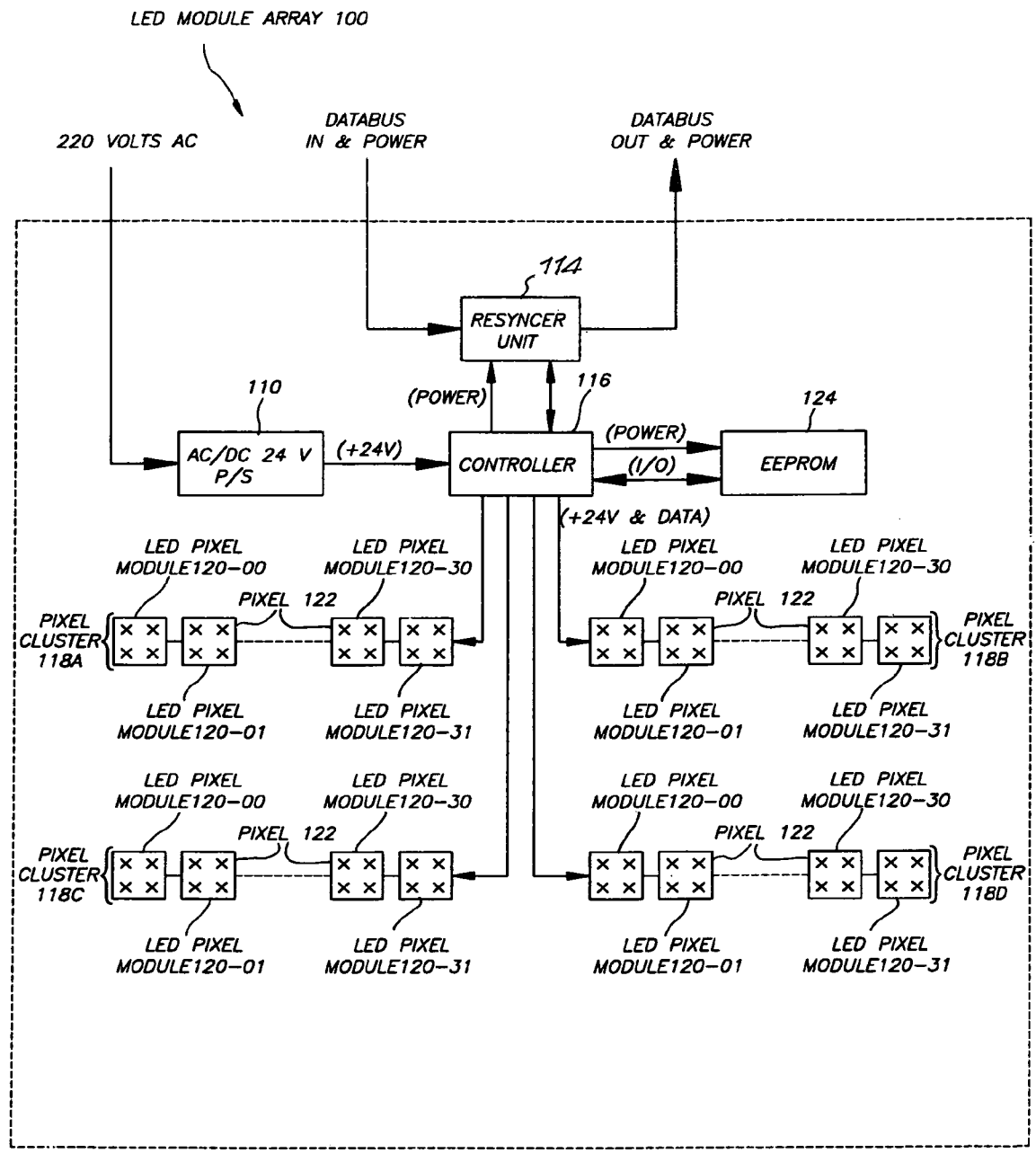
FIG. 1 is a functional block diagram of an array of LED pixel modules according to the invention.
Figure 2:
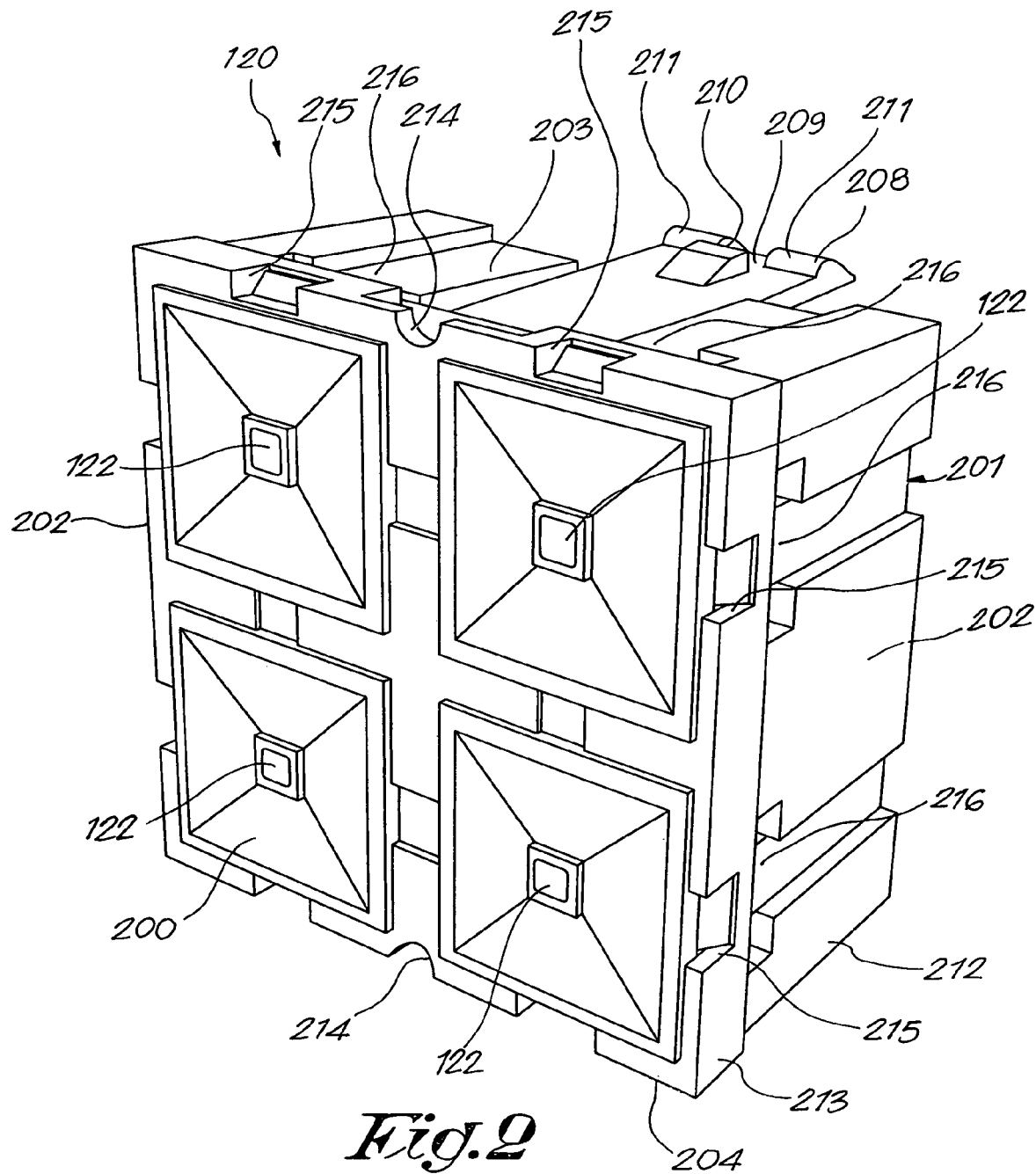
FIG. 2 is a front perspective view of a single LED pixel module in accordance with the invention.
Figure 3:
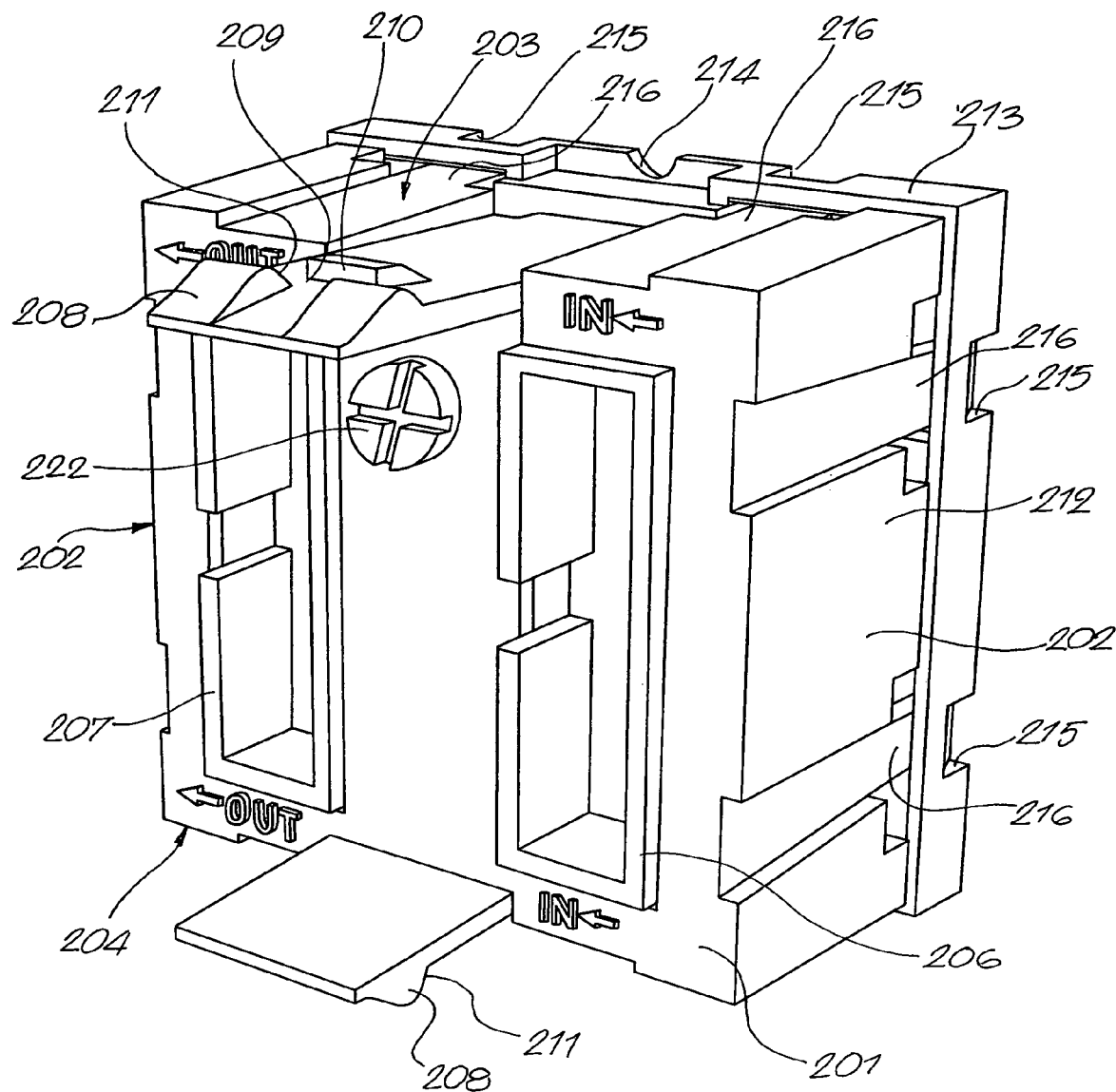
FIGS. 3 and 4 are respectively a back perspective view and a side perspective view of the LED pixel module represented in FIG. 2.

FIG. 1 is a functional block diagram of a pixel module array 100, in particular a LED module array, which is, for example, a portion of a larger LED display system (not shown) formed of a sequential string of similar LED module arrays 100. A detailed description of a LED display system is found in reference to another patent application of the same applicant.

While the specific embodiment of the module concept of the present invention is demonstrated by use of LED module array 100, any kind of addressable display technology may be used, be it phosphorescent, electroluminescent, organic/inorganic emissive, reflective or other known display technologies.

LED module array 100 includes an AC-to-DC (AC/DC) converter 110, a resynchronizer (resyncer) unit 114, and a controller 116 driving a plurality of pixel clusters 118 that further include a plurality of LED pixel modules 120, according to the invention.

For example, a pixel cluster 118a includes thirty-two LED pixel modules 120, i.e., LED pixel modules 120-00 through 120-31, each of which includes four pixels 122; a pixel cluster 118b includes thirty-two LED pixel modules 120, i.e., LED pixel modules 120-00 through 120-31, each of which includes four pixels 122; a pixel cluster 118c includes thirty-two LED pixel modules 120, i.e., LED pixel modules 120-00 through 120-31, each of which includes four pixels 122; and a pixel cluster 118d includes thirty-two LED pixel modules 122, i.e., LED pixel modules 120-00 through 120-31, each of which includes four pixels 122.

At last, LED module array 100 includes an EEPROM 124.

AC/DC 24V power supply 110 is any standard AC/DC power supply having a universal AC input range and a 24-volt DC output with a maximum output current of, for example, 4 amps for powering resyncer unit 114, controller 116, and LED pixel modules 120. AC/DC 24V power supply 110 maintains its output voltage at a constant level regardless of input voltage variations as long as the input voltage is within a specified tolerance. An example AC/DC 24V power supply 110 is a switch mode power supply with power factor correction, such as a Hitron model HVP103-240042. There are one or more AC/DC 24V power supplies 110 associated with any given LED module array 100. The number of AC/DC 24V power supplies 110 associated with LED module array 100 depends on the number of pixel clusters 118 contained therein. AC/DC 24V power supply 110 provides power for LED pixel modules 120 wherein a DC-to-DC down-conversion occurs. A more detailed description of the electrical functions of LED pixel modules 120 is found in reference to yet another patent application of the applicant filed on the same day as the present application.

Additionally, a more detailed description of the physical hardware implementation of LED pixel modules 120 is found hereafter in reference to FIGS. 2, 3, 4, and 5.

Resyncer unit 114 is a device that receives and re-transmits the serial video and serial control data directly from one LED module array 100 to a next LED module array 100 (not shown) in a sequential string of LED module arrays 100. More specifically, resyncer unit 114 receives a DATABUS IN signal, which is representative of serial video and serial control data, and transmits this data to the next device in sequence via a DATABUS OUT signal. The serial video data is red, green, and blue data containing the current video frame information to be displayed on LED module array 100.

Controller 116 is a standard microprocessor device, such as a Philips 8051 8-bit microcontroller or a Motorola 6816 16-bit microcontroller, or alternatively a custom controller within a field programmable gate array (FPGA) device. Controller 116 manages and distributes the video data by receiving and parsing the DATA IN into specific packets associated with the location of a given LED pixel module 120 of a given LED module array 100 of the larger LED display system. Algorithms running on controller 116 facilitate the process of identifying the portion of the serial DATA IN signal that belongs to its physical portion of the larger LED display system. Additionally, controller 116 manages the pulse width modulation (PWM) associated with driving pixels 122 of each LED pixel module 120.

LED pixel modules 120 each include an array of (k×n) pixels 122 positioned on any user-defined pitch. For example, a 2×2 array of pixels 122 is shown in FIG. 1.

Pixels 122 are representative of devices of any addressable display technology, such as standard LEDs or organic light-emitting diode (OLED) devices. Furthermore, for full color, each pixel 122 is formed of a red, a green, and a blue sub-pixel, as is well-known.

Each LED Pixel module 120 contains a DC/DC converter (not shown) to convert 24-volt DC input voltage to a 5-volt DC output voltage at up to 0.250 amps for powering LED pixel module 120. Each LED pixel module 120 also includes a set of constant current drivers (not shown) for driving its associated pixels 122. Furthermore, each LED pixel module 120 contains a local storage device (not shown), such as an EEPROM, for storing production data and factory light output measurements, as well as color coordinates for each pixel 122 within LED pixel module 120 in the form of (x,y,Y), where x and y are the coordinates of the primary emitters and Y is defined as the brightness. During calibration all values are read from the EEPROM within each LED pixel module 120 and are then used to calculate the correction values. These calculated values are then stored in EEPROM 124 on LED module array 100.

EEPROM 124 is any type of electronically erasable storage medium for pervasively storing information. For example, EEPROM 124 may be a Xicor or Atmel model 24C16 or 24C164. A more detailed description of the electrical functions of LED module array 100 is found in reference to another patent application in the name of the same applicant.

In the example shown in FIG. 1, LED pixel modules 120-00 through 120-31 of pixel cluster 118*a* and LED pixel modules 120-00 through 120-31 of pixel cluster 118*b* are physically arranged from left to right to form a first contiguous string of sixty-four picture elements. Below this first string, LED pixel modules 120-00 through 120-31 of pixel cluster 118*c* and LED pixel modules 120-00 through 120-31 of pixel cluster 118*d* are physically arranged from left to right to form a second contiguous string of sixty-four pixel elements. In this way, a 64×2 array of LED pixel modules 120 is formed. In this example, each LED pixel module 120 contains a 2×2 array of pixels 122, the result is that LED module array 100 contains a 128×4 array of pixels 122. The number of LED pixel modules 120 and pixels 122 contained therein is not limited to that shown in FIG. 1. The number of LED pixel modules 120 and pixels 122 are user defined depending upon, for example, the available power and data rate.

With reference to FIG. 1, the operation of LED module array 100 is as follows. Power is applied to LED module array 100. A central controller (not shown) of the larger LED display system provides serial video and control data that is passed from one LED module array 100 to the next via the DATABUS IN and DATABUS OUT of each respective resyncer unit 114. Controller 116 of LED module array 100 receives the video data stream and subsequently parses this information into specific packets associated with the location of the given controller 116 within the larger LED display system. Algorithms running on controller 116 facilitate the process of identifying the portion of the serial DATABUS IN signal that belongs to its physical portion of the larger LED display system. Subsequently, controller 116 distributes the appropriate serial video data stream from one LED pixel module 120 to the next LED pixel module 120 (with their associated pixels 122) of each pixel cluster 118 according to the respective x and y coordinates. This video data transfer operation occurs for each video frame under the control of the central controller (not shown) of the larger LED display system, thereby creating an image for viewing. The arrangement and maximum number of pixel clusters 118 and associated LED pixel module 120 is not limited to that shown in FIG. 1.

FIGS. 2, 3, 4 and 5 represent a LED pixel module 120 in accordance with the invention. LED pixel module 120 operates within an array of LED pixel modules 120 to form a complete display.

Figure 4:
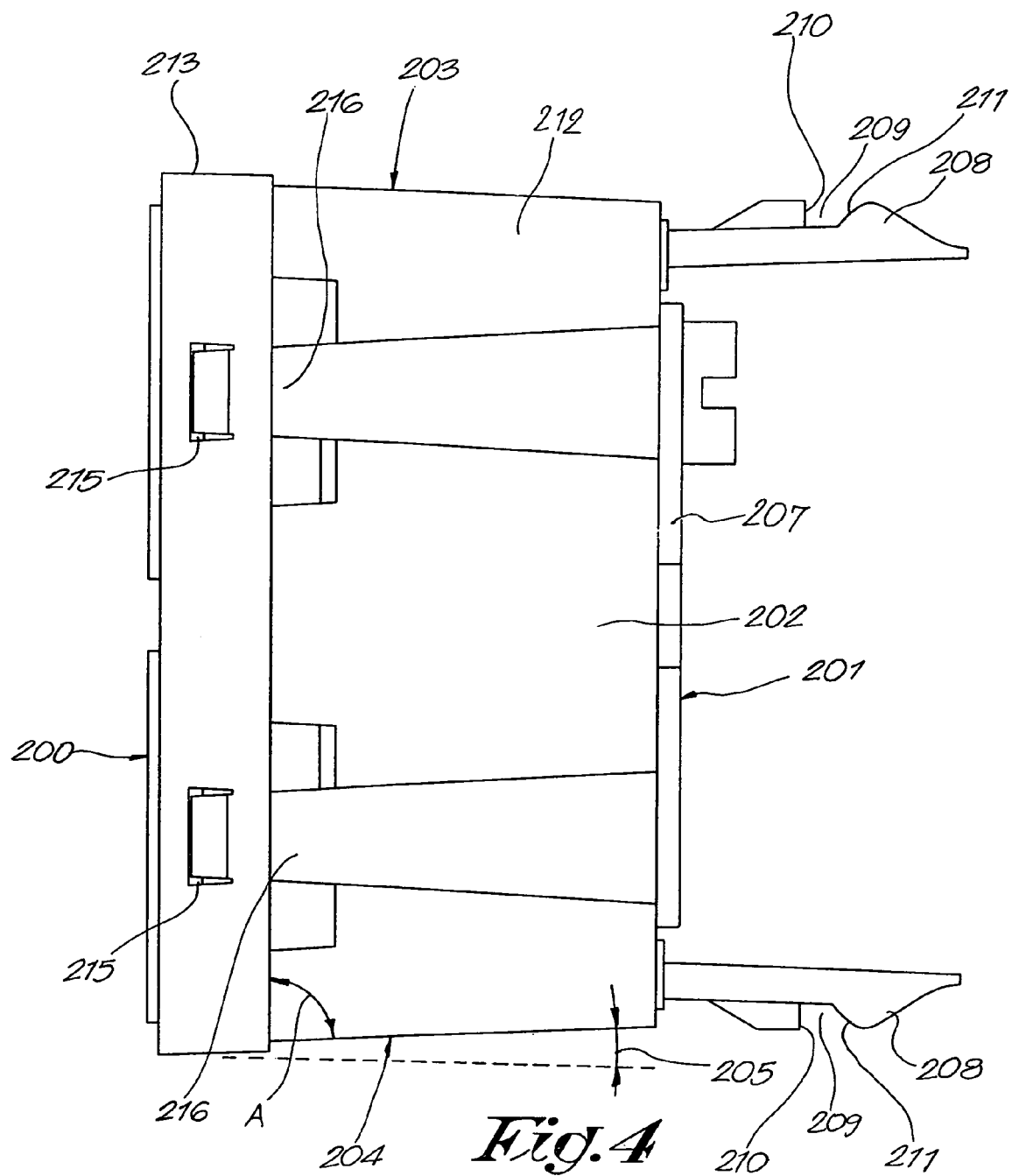

LED pixel module 120 comprises a front wall 200, a rear wall 201, two side walls 202, an upper wall 203 and a lower wall 204, which walls 202, 203 and 204, according to the invention, are tapered inwardly, showing a taper 205 enclosing an angle A with the front 200, as represented in FIG. 4.

Four pixels 122 which, in this particular case, are LED pixels 122, are integrated in the front wall 200, whilst an input connector 206 and an output connector 207 are integrated at the rear of the pixel module 120.

Two fixing clips 208 protrude from the back wall 201 of the pixel module 120, each of which includes a clip notch 209 that further includes a clip stop 210 and a clip notch taper 211.

Figure 5:
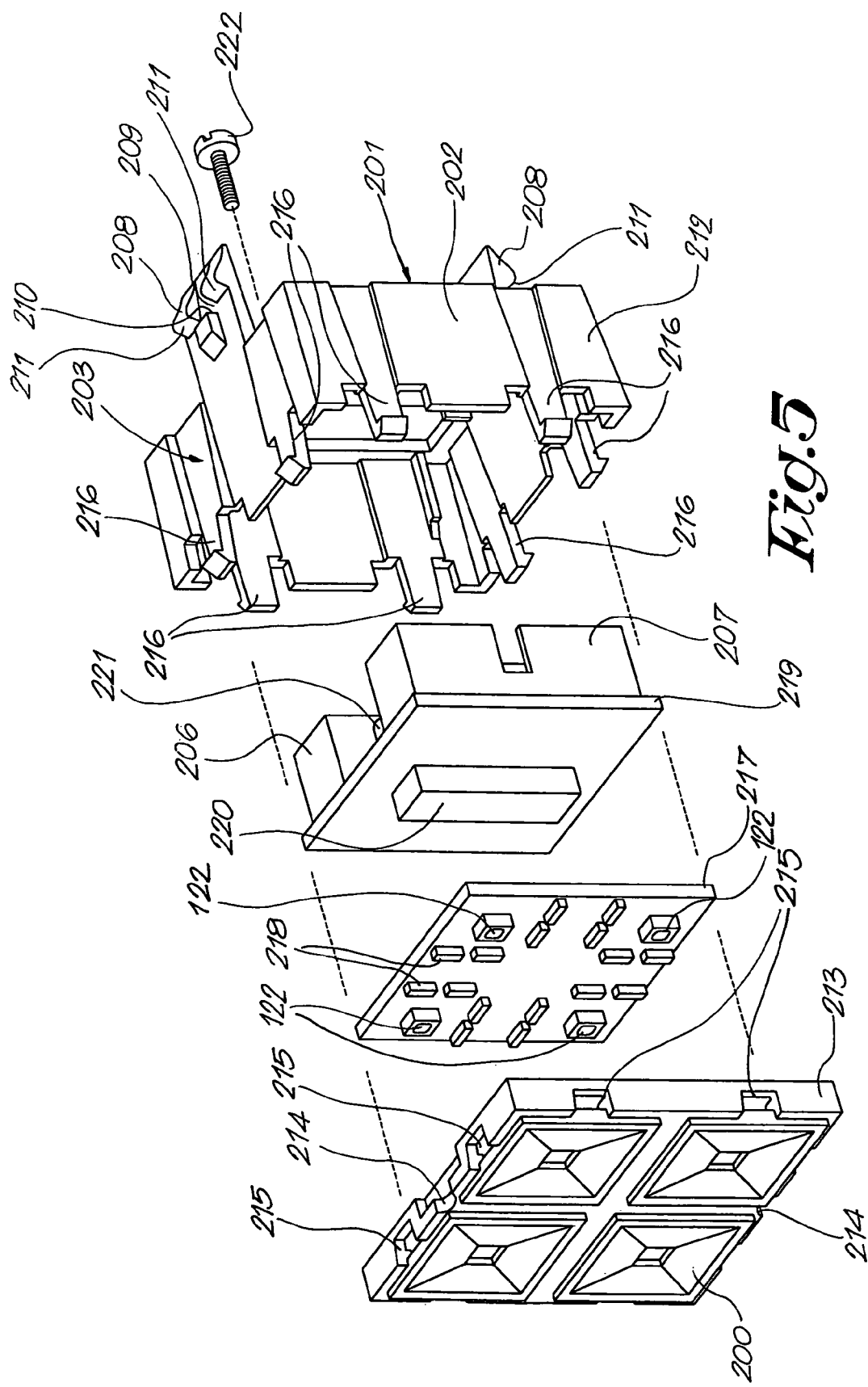
FIG. 5 is an exploded view of the LED pixel module represented in FIG. 2.

The exploded view of FIG. 5 shows that the housing of the pixel module 120 is further composed of an enclosure 212 which is open at the front and which is covered by means of a shader 213 which forms the above mentioned front wall 200. The shader 213 is provided, on the one hand, with two shader notches 214, which are positioned in front of the clips 208, and, on the other hand, with a plurality of holes 215 which can cooperate with a corresponding number of assembly snaps 216 which are provided at the front of the enclosure 212.

The housing of the pixel module 120 accommodates a pixel printed circuit board (PCB) 217 that further includes pixels 122 and a plurality of electronic components 218 located on one or both sides of the PCB; a driver PCB 219 that further includes the above mentioned input connector 206; the output connector 207; a PCB connector 207, which can cooperate with a corresponding PCB connector (not shown) at the back of the pixel PCB 217; a plurality of electronic components (not shown) located on one or on both sides of the PCB 219; and a metallic mount 221 which can come into contact with a screw 222 mounted at the back of the enclosure 212.

With reference to FIGS. 2, 3, 4 and 5, the elements of LED pixel module 120 are described as follows:

Enclosure 212 serves as the primary mechanical structure upon which and within which all other elements of LED pixel module 120 are mounted. Enclosure 212 is formed of any suitably strong material, such as molded plastic, that can support the structure of LED pixel module 120. Furthermore, shader 213, assembly snaps 216, clips 208, input connector 206 and output connector 207 are likewise formed of molded plastic. Shader 213 has preferably a black color, since this will improve the contrast of the display. The front side of the shader 213 can have a (random) texture. The purpose of this texture is to improve the contrast of the display by e.g. reducing the number of disturbing ambient light reflections.

Enclosure 212 is sized according to a predetermined configuration and spacing of pixels 122, and of the dimensions of pixel PCB 217 and driver PCB 219 which houses within the enclosure 212. For an example, pixels 122 are spaced 20 mm apart from center to center in a square pattern within a square shader 213 having an outside dimension of 40 mm on each side. Therefore, approximate overall dimensions for the body of enclosure 212 of this example are 40×40×22 mm. Shader 213 forms the front cover of enclosure 212 and maintains at least a 120-degree viewing angle of pixels 122. Shader 213 is fastened to enclosure 212 by engaging and locking assembly snaps 216 (formed as part of enclosure 212) within holes 215 of shader 213, providing a snap-together assembly for LED pixel module 120.

Mounted on the rear of the body of enclosure 212 are means to fix the module on a mounting surface of a display, which means are formed by two clips 208 that protrude, for example, an additional 13 mm from the rear of the body of enclosure 212. These clips 208 allow enclosure 212 to be securely fastened to a suitable mounting surface, such as a metal plate with appropriately sized apertures (not shown). The apertures in the mounting surface are sized to allow clips 208 to pass through the mounting plate, and are located so that LED pixel module 120 is held in place through the spring action of clips 208 on the mounting surface through the apertures.

When installed, the thickness of the mounting surface is held within clip notch 209 between clip stop 210 and clip notch taper 211. Clip notch taper 211 forms an angle, for example, 45 degrees, with respect to the long axis of clip 208 and is used to accommodate a small range of variability in the thickness of the mounting surface, for example 1.5 mm to 2 mm. This makes it also possible to fasten the LED pixel modules 120 to a curved mounting surface. Access to clips 208 for disassembly is possible without tools from the rear of the mounting plate, or with a tool (not shown) through shader notch 214.

Metal screw 222, which also comes into contact with grounded metallic mount 221, passes through the rear of enclosure 212 and fits into a threaded fastener (not shown) mounted on driver PCB 219 within enclosure 212 to provide a common electrical ground for all LED pixel modules 120 within a display. In addition, screw 222 can be used to provide additional support to the mounting surface.

Those skilled in the art will appreciate that the dimensions of the elements of LED pixel module 120 are not limited to those mentioned above. The overall dimensions of LED pixel module 120 and its elements are user defined and may vary depending upon any given application.

Disposed within enclosure 212 is pixel PCB 217, which further includes four pixels 122. Each pixel 122 is formed of a red, a green, and a blue sub-pixel, as is well-known. Also mounted upon pixel PCB 217 are electronic components 218, for example, decoupling capacitors, which provide electronic support for the operation of pixels 122, constant current drivers, and a connector (not shown) that joins with board-to-board PCB connector 220 when assembled. Also disposed within enclosure 214 are driver PCB 219 including board-to-board PCB connector 220, input connector 206, output connector 207, and electronic buffers, drivers, and power circuits (not shown). Board-to-board PCB connector 220 is mounted upon driver PCB 219 and provides electrical contact between driver PCB 219 and pixel PCB 217.

Instead of using a board-to-board connector to connect the driver PCB 219 and the pixel PCB 217, it is also possible to connect both PCBs with a flexfoil. This flexfoil will than be bent so that the two PCBs can be placed on top of each other within module enclosure 212.

Input connector 206 and output connector 207 are also mounted upon driver PCB 219 and physically protrude from the apertures on the rear of enclosure 212. Input connector 206 provides the electrical connectivity to the power source and binary data, clock, and control signals of LED module array 100, for example, +24-volt power, and digital RS232 and I²C serial buses, that control the illumination intensity and hue of the light from LED pixel module 120. Input connector 206 is electrically connected to controller 116 of FIG. 1 or is serially connected to other LED pixel modules 120. Also mounted upon driver PCB 219 are electronic buffers and drivers (not shown), for example, shift registers and line drivers, which receive and buffer the binary control signals of LED module array 100 through input connector 206. The electronic buffers and drivers of driver PCB 219 subsequently process these signals for use within LED pixel module 120, and also pass these signals to output connector 207, where they are delivered to the next serially connected LED pixel module 120 in LED module array 100. A more detailed description of the electrical functions of LED pixel module 120 is included in another patent application of the same applicant.

In installation, LED pixel module 120 can be easily assembled by pressing assembly snaps 216 of enclosure 212 into shader 213, and snapping the assembly together with pixel PCB 217 and driver PCB 219 properly aligned and sandwiched in between. Pixel PCB 217 and driver PCB 219 fit snugly within the cavity made by shader 213 and enclosure 212 and are maintained in place using pressure fit features (not shown), which capture and hold pixel PCB 217 and driver PCB 219 in place.

Installation of LED pixel module 120 into the mounting surface (not shown) can be readily accomplished by inserting LED pixel module 120 into the aperture of the mounting surface and snapping clips 208 into apertures in the mounting surface (not shown). Subsequently, screw 222 is manually adjusted without tools to contact a grounded metallic mounting surface (not shown). Another possibility is that screws 222 are not yet inserted in the LED pixel modules when they are mounted. After the mounting of LED pixel modules 120, a cable for grounding can be attached to some or all of the LED pixel modules 120 by means of screw 222. The other end of this cable will than be attached to a grounded surface.

Extraction of LED pixel module 120 is easily performed without tools from the rear of the mounting surface by squeezing clips 208 toward one another and pushing out LED pixel module 120. Alternatively, LED pixel module 120 can be removed from the front by inserting a tool (not shown) through shader notch 214 to compress clips 208, thereby freeing LED pixel module 120 from the mounting surface.

LED module array 100 may be constructed from a plurality of LED pixel modules 120 forming a display configuration of a variety of sizes and form factors. In addition, taper 205 of enclosure 212 enables LED pixel modules 120 to be installed in a non-planar fashion to implement a variety of convex or concave displays for creating 3D effects that are application specific. For example, a 3-degree angle A of taper 205 of enclosure 212 allows a cylindrical display with constant pixel pitch to be constructed with a minimum cross-sectional diameter of approximately 80 cm. Other shapes are possible, including concave, convex, combinations of concave and convex, saddle shapes, etc.

It is clear that not all of the walls 201 through 204 need to be tapering inwardly to achieve the benefit of the invention to be able to form complex 2D and 3D shapes.

The present invention is in no way limited to the form of embodiment described by way of example and represented in the figures, however, such a display pixel module for use in a configurable large-screen display application, as well as such a display, can be realized in various forms without leaving the scope of the invention.

The invention claimed is:

1. A display pixel module for use in a configurable large-screen display application, said module having front, side, upper and lower and rear walls, and comprising an array of pixels mounted at the front wall of the module and provided with input and output connectors, wherein at least some of the side walls and of the upper and lower walls are tapered inwardly, enclosing an angle with the front wall, such that at least two opposite sidewalls or upper and lower walls extend in non-parallel directions, and including a mounting device to enable fixing the module on a mounting surface of a display.

2. The display pixel module according to claim 1, wherein the side walls, the upper wall and the lower wall are all tapered inwardly.

3. The display pixel module according to claim 1, wherein said mounting device comprises at least two clips protruding from the rear of the pixel module.

4. The display pixel module according to claim 3, wherein each clip includes a clip notch that further includes a clip stop and a clip notch taper.

5. The display pixel module according to claim 4, wherein the clip notch taper forms an angle with respect to a longitudinal axis of clip.

6. The display pixel module according to claim 1, wherein the housing of the module is provided with notches enabling access to the clips from the front wall of the pixel module.

7. The display pixel module according to claim 1, wherein the pixels are formed by light-emitting diodes.

8. The display pixel module according to claim 1, including a housing which is formed of an enclosure which is covered at the front by means of a shader.

9. The display pixel module according to claim 8, wherein the enclosure is provided with a plurality of assembly snaps which cooperate with a plurality of corresponding holes of the shader.

10. The display pixel module according to claim 6 wherein said notches which enable access to the clips are provided in the shader.

11. The display pixel module according to claim 8, wherein the shader has a texture to improve the contrast of the display.

12. The display pixel module according to claim 8, wherein the enclosure accommodates a pixel printed circuit board on which said array of pixels is mounted.

13. The display pixel module according to claim 8, wherein the enclosure accommodates a driver printed circuit board which is equipped with an input connector and an output connector, both connectors protruding through apertures in the rear wall of the enclosure.

14. The display pixel module according to claim 12, wherein the driver printed circuit board is equipped with a board-to-board connector that can cooperate with a corresponding connector on the pixel printed circuit board.

15. The display pixel module according to claim 12, wherein the pixel printed circuit board and the driver printed circuit board are interconnected by means of a flexfoil.

16. The display pixel module according to claim 13, wherein driver printed circuit board is provided with a metallic mount to make contact with a screw that can be grounded.

17. A display, comprising a plurality of pixel modules according to claim 1, which are arranged on a mounting surface to form a 2D or 3D display.

* * * * *